United States Patent [19]

Ackley

[11] 4,167,429
[45] Sep. 11, 1979

[54] METHOD OF MANUFACTURING RESIN SHEETS REINFORCED WITH GLASS AND CARBON STRAND

[75] Inventor: Richard H. Ackley, Oakmont, Pa.

[73] Assignee: PPG Industries, Inc., Pittsburgh, Pa.

[21] Appl. No.: 856,149

[22] Filed: Nov. 30, 1977

[51] Int. Cl.$^2$ .................. B32B 5/02; B65H 81/00
[52] U.S. Cl. .................................. 156/174; 118/125; 118/420; 156/180; 427/358; 427/434 D; 427/434 E
[58] Field of Search ............... 156/180, 441, 174, 181, 156/426, 161, 175, 173, 172, 433; 428/367, 408, 373, 378, 375; 57/140 G, 140 C, 140 BY, 164; 427/177, 434 E, 434 D, 356, 358; 118/125, 234, 420

[56] References Cited

U.S. PATENT DOCUMENTS

| | | | |
|---|---|---|---|
| 3,301,742 | 1/1967 | Noland et al. | 428/367 |
| 3,560,065 | 2/1971 | Shobert et al. | 308/238 |
| 3,769,126 | 10/1973 | Kolek | 156/172 |
| 4,084,399 | 4/1978 | Kanemaru et al. | 57/140 BY |

FOREIGN PATENT DOCUMENTS

1336128 11/1973 United Kingdom ............... 428/367

OTHER PUBLICATIONS

Modern Plastics Encyclopedia, pp. 54, 10A, 172 & 177, Oct. 1977.
Advanced Materials, C. Z. Carroll-Porczynski, Chemical Publishing Co., Inc., N. Y., 1962, pp. 135–157.
Encyclopedia of Chemical Technology, Kirk-Othmer, vol. 4, pp. 241–243.

*Primary Examiner*—Michael W. Ball
*Attorney, Agent, or Firm*—Paul A. Leipold; John E. Curley

[57] ABSTRACT

A method of preparing resin sheets reinforced by glass and carbon strands is described in which the glass strands are passed through a resin bath. The glass strands are passed through a die as they emerge from the bath to control their resin content and wound on a mandrel. The carbon strands are passed directly into the die and are wetted by the resin in the die and on the mandrel. The glass and carbon strands are laid on the mandrel with resin to provide a resin sheet containing 5 to 70 percent glass by weight and 60 to 5 percent carbon strand by weight.

5 Claims, 3 Drawing Figures

METHOD OF MANUFACTURING RESIN SHEETS REINFORCED WITH GLASS AND CARBON STRAND

BACKGROUND OF THE INVENTION

In recent years the need for structural plastic parts has increased rapidly. Thus directionally reinforced resin sheets which can be molded into structural automotive parts such as transmission supports, door beams and the like have been produced. These directionally reinforced sheets contain glass strands which have been helically wound on a mandrel in a crisscross pattern and in amounts ranging between 60 to 80 percent by weight glass. While moldable glass reinforced sheets of a high glass content produce parts having excellent structural strength when molded, it is often desired to provide better modulus characteristics than are normally realized. Carbon fibers in molded parts are known to impart good modulus characteristics to resin parts in which they are employed. Blends of glass and carbon fibers in resins have thus been used to utilize the qualities of strength and modulus that each provides to a resin matrix. In attempting to wind carbon fibers with glass fibers in the preparation of resin reinforced sheeting, considerable difficulty has been encountered processing the carbon strands. Thus, frequently the carbon fibers which are in strand form break in the resin bath or the die. This appears to be caused by the viscous drag on the strand going through the bath which causes the strand of carbon to filamentize, i.e., separate into the filaments forming it, and ultimately break out. In accordance with the instant invention, a method has been developed to wet the carbon strand with resin and combine it with the glass strands to provide a useful resin sheet reinforced with both carbon and glass strand.

THE PRESENT INVENTION

In accordance with the instant invention, carbon and glass strands are wound on a mandrel to prepare the resin sheets. In the process the glass stands are fed from a glass supply into a resin bath where they are thoroughly wetted. The strands of glass are then passed through a die metering means which regulates the quantity of resin which is to be included with the glass strands. The carbon strand of the composite to be made is fed directly to the back of the die used to control the resin content of the glass strand and is contacted with the resin at the point where the resin backwashes from the die. Feeding the carbon strand at this point in the process eliminates the fiberizing of that strand, provides good wet out to the strand and permits it to be wound on the mandrel with the glass without the attendant breaks encountered when the carbon strand is fed through a resin bath.

DETAILED DESCRIPTION OF THE INVENTION

In the preparation of glass-carbon resin reinforced sheet having structural characteristics and containing 55 to 80 percent glass and carbon with 20 to 45 percent resin, the strands of carbon and glass are first coated with a resin and then are wound on a rotating mandrel. In the discussion of the process, reference will be made to the accompanying drawing in which.

Figure 1:
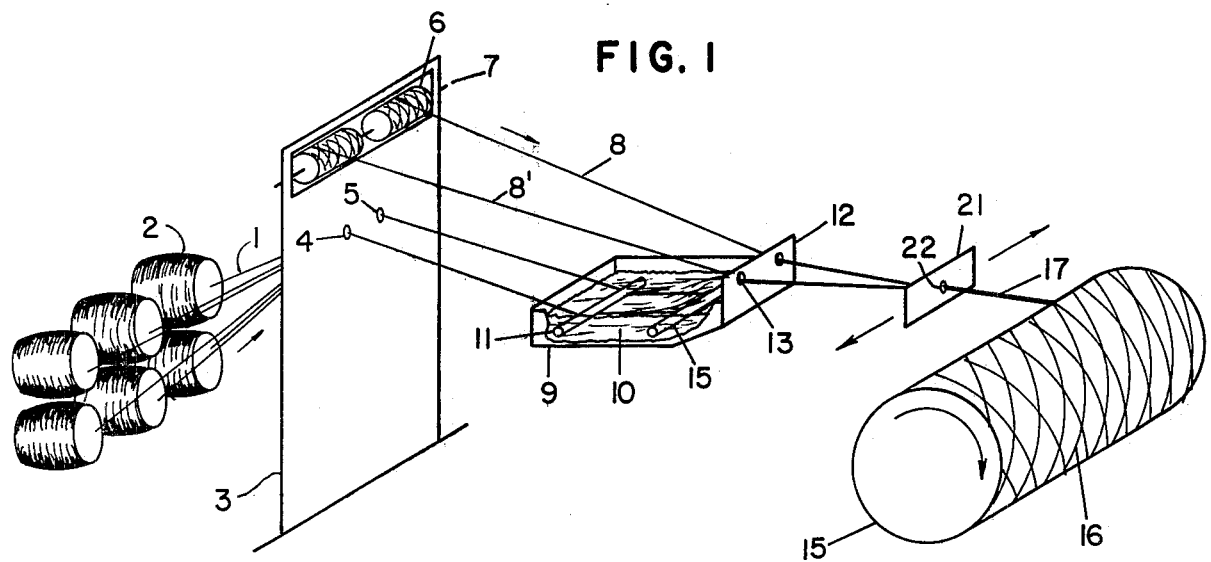
FIG. 1 is a flow sheet in perspective of the equipment used to manufacture the resin-glass-carbon sheets of the instant invention.
Figure 2:
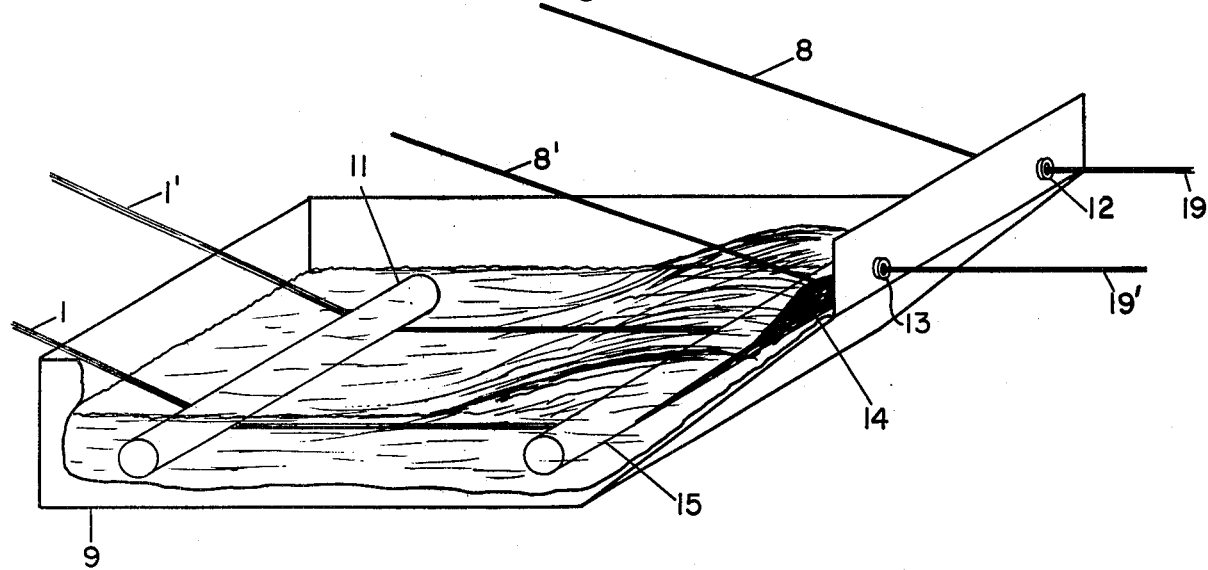
FIG. 2 is an enlarged view in perspective of the resin application section of the process depicted in FIG. 1.
Figure 3:
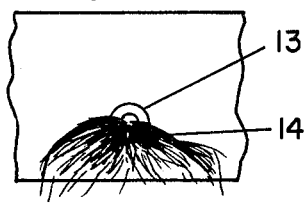
FIG. 3 is a section view looking into the resin application pan 9 to show the die 13 and point of entry of the carbon strand.

In the preparation of the resin-glass-carbon composites of the instant invention a plurality of glass strands are used. As shown in FIG. 1 for illustrative purposes, only six glass fiber forming packages 2 are employed. These packages 2 are mounted on a stand or creel, not shown, and the glass strand 1 from each of the packages are threaded through eyelets 4 and 5 mounted on the wall member 3, typically a sheet metal plate. In the illustration of FIG. 1 the upper row of glass forming packages have their strands 1 passed through eyelet 5 and the lower row strands 1 are passed through eyelet 4. The physically combined strands form two glass ribbon 1 and 1' which are passed under the retaining bars 11 and 15 of the resin tank 9. These ribbons 1 and 1' are then fed through the die 12 and 13 located at the forward end of the pan 9. Mounted on the top of the wall 3 are two packages 18 and 18' which contain carbon strands 8 and 8', respectively. The carbon strands 8 and 8' are introduced into the dies 12 and 13, respectively, by passing them through the resin backwash 14 accumulating as the dies wipe resin from the surface of the glass ribbons 1 and 1'. The consolidated glass-carbon ribbons 19 and 19', which exit the dies 12 and 13, are then consolidated into a band 17 in guide eyelet 22 located on a traveling guide 21 and this ribbon is wound on a rotating mandrel 15 to the desired thickness. After the composite reaches its desired thickness, the mandrel 15 is stopped and the resulting sheet is cut from its surface and the process is repeated.

The process generally depicted in the drawing is obviously subject to many variables. Thus, while only one ribbon 17 is shown in the drawing as being wound on the mandrel 15, this is solely for illustrative purposes. The mandrel may have many composite strands 17 wound at the same time on its surface. Similarly the number of glass strands 1 used to form the ribbon 1' can be varied. Thus one strand 1 can be used as the ribbon 1' or any multiple of strands 1 can be used to form the ribbon 1'. Typically the number of strands employed to form the ribbons 1' has ranged from 1 to 10 or more. The width of the ribbon 1' desired in the final product determines the number and diameter of strands 1 that will be used to form the ribbons 1'. By width of band is meant the width measured perpendicular to the band direction.

In the process shown in the drawing the mandrel 15 is rotating in a clockwise direction on a shaft, not shown, which is driven by a suitable motor. The guide plate 21 reciprocates in a horizontal plane and lays the composite strand 17 down on the surface of the mandrel 15. The strand 17 is normally laid on the mandrel 15 at a predetermined helix angle to provide directional reinforcement properties to the finished sheet. The helix angle is the included acute angle created by the intersection of the band 17 on the body of the mandrel 15 with a line on the body of the mandrel parallel to the longitudinal axis of the mandrel. This angle for the structural sheets produced by this process is generally in the range of 60 to 89 degrees. The wind angle of the mandrel in relation to the strand 17 is the included acute angle created by the intersection of the band 17 on the body of the mandrel 15 with a line on the body of the mandrel perpendicular to the longitudinal axis of the mandrel. In a typical use of the process this angle is between 30 to 1 degrees.

In the normal operation the mandrel 15 rotates continuously during the process and the guide 21 reciprocates in a horizontal plane causing the ribbon or band 17 to be land down on the mandrel 15 in a crisscross fashion to form layers of composite on the surface of the mandrel. For purposes of this disclosure a layer is formed when the band 17 has covered the mandrel in both traversing directions. The finished sheet containing the glass and carbon strands will contain the number of layers desired to produce a product of the desired density in pounds per square foot.

The resin pan 9 during the operation is constantly supplied with resin 10 to insure that sufficient resin is maintained in the pan 9 to thoroughly wet the glass strands 1 and 1' which are passed through it under the bars 11 and 15. This can be done continuously by providing an automatic feed inlet and overflow system or the resin can be added manually as required. The pan 9, depending on the width of the mandrel 15 can remain stationary or it can be reciprocated in a horizontal plane coordinated with the movement of the plate 21.

The resins employed in the system may include many types and typically resins such as vinyl esters, quick curing epoxy resins and general purposes polyester resins have been employed. Isophthalic polyester resins have been found to be particularly effective in making the composites of this invention and are preferred. Typicaly polyesters which may be employed in the process are the class of resins shown and described in U.S. Pat. No. 3,840,618, incorporated herein by reference.

An important consideration in preparing composites is the regulation of the resin content of the final product. In this process this is accomplished by regulating the size of the orifice in the dies 12 and 13. In general it has been found desirable to maintain these orifices in the range of 0.014 to 0.078 inch.

The graphite strands fed to the system may be pulled directly from the wall member 3 as shown or can be drawn from a creel placed closer to the front end of the pan 9. The point of entry of the carbon strand in the resin pan is an important consideration in achieving success in forming the composite ribbons or bands 19 and 19' however. The residence time and drag on the carbon strand must be minimized to prevent damage or degradation to the strand. Thus, it is important that the carbon strand be introduced into the process at or close to the entrance to the dies and preferably in the central area of the resin backwash of that die. This prevents the carbon strand from receiving any excessive strain of being pulled through the resin and allows the strand of carbon to enter the system with little or no viscous drag applied to it.

The composites produced by this process on a volume basis generally contain 50 to 5 percent carbon strand and 5 to 50 percent glass strand. The strands of carbon and glass are fed to the system and the composite strand wound on the mandrel at speeds ranging between 50 and 500 feet per minute.

The resins used are applied to the composite strands and typically the sheets formed are placed between two layers of clear sheet such as polyethylene. Thus in practice the surface of the mandrel is covered with a polyethylene sheet prior to winding the resin containing composite strand. When the requisite number of layers have been applied to the mandrel, the mandrel is stopped and the composite sheet is covered with another layer of polyethylene sheet and then cut from the mandrel. By sandwiching the composite sheet between the polyethylene layers, the resin composite can be readily handled and stored until a molded part is to be made from it. Heat applied to the composite sheet during molding converts the sheet product into a thermoset, hardened part.

Carbon strands are produced by treating organic fibers by pyrolysis to produce strands of carbon fibers. Thus, carbon filaments have been produced by pyrolyzing rayon precursor yarns, polyacrylonitriles and the like. Several of these strands are available in industry today and have been described in the literature. (*Modern Plastics Encyclopedia*, 54, 10A, page 172, Oct. 1977; *Advanced Materials*, C. Z. Carroll-Porczynski, Chemical Publishing Co., N.Y. 1962.) A particularly useful strand for use in the instant process is a carbon fiber called CELION ® manufactured by Celanese Corporation.

In a typical application of the present process a resin-glass-carbon sheet was made by filling the resin pan with a resin mixture containing 90 parts of an isophthalic polyester resin, 10 parts of styrene monomer, 0.5 part of zinc stearate, 1 part tertiary butylperbenzoate and 3.5 parts of magnesium oxide thickener.

Twelve glass fiber forming packages were mounted on a creel, each of the packages containing K-37 glass strands. These strands have 400 glass filaments, each filament having a diameter of 0.0005 inch. Three glass ribbons were prepared by pulling strands from four packages and combining them prior to introducing them into the resin pan. A total of three glass ribbons were passed through the resin pan continuously at a rate of 300 feet per minute. The resin pan containing the resin mixture referred to above was maintained constantly supplied with resin during the run. The three glass strands passing through the resin pan were withdrawn through three precision dies, each having a diameter of 0.045 inch. Three carbon strands were fed into the system by passing one of each into a die through which each of the three glass ribbons was being fed and on the resin pan side of the die so that the carbon strand entered the die near the center portion in the backwash of resin that was generated by the die in wiping excess resin from the surface of the glass ribbon being fed thereto. In passing through the die, the carbon strand becomes wetted with the resin contained in the die and the backwash and is physically combined with the glass ribbon passing through the die to thereby form three consolidated glass-carbon bands or ribbons. These three consolidated ribbons were passed through three guide eyes positioned on a reciprocating guide device positioned above a rotating mandrel. The strands were wound on the surface of the mandrel in side by side relationship at a helix angle of 85.4 degrees and a wind angle of 4.6 degrees. The reciprocating guide was passed back and forth above the surface of the mandrel and the consolidated strands were wound thereon until three layers were laid on the mandrel surface. The mandrel was then stopped and the composite strand-resin sheet was removed. The finished sheet was cut to a blank size for molding flat panels. Panels were molded from these blanks on a press and formed satisfactory structural panels.

While the invention has been described with reference to certain specific embodiments, it is not intended to be limited thereby except insofar as appears in the accompanying claims.

I claim:

1. A method of forming a sheet of resin reinforced with glass and carbon strands comprising coating glass strands with a heat curable polyester resin, passing the coated glass strands through a metering means to remove excess resin and regulate the glass-resin content on a weight basis, introducing carbon strand directly into the metering means to minimize fiberizing of said carbon strand, wetting the carbon strand with resin as it passes through the metering means and consolidating the carbon strand with the glass strand, removing the consolidated glass and carbon strand from the metering means and directing it onto the surface of a rotating mandrel, reciprocating the consolidated strand across a rotating surface to apply said consolidated strand on said surface in successive layers and cutting the resulting layered composite resin consolidated strand product from the surface.

2. The method of claim 1 wherein the said consolidated strand is applied to said surface at a helix angle of between 60 and 89 degrees.

3. The method of claim 1 wherein the resin content of the layered composite is between 20 to 45 percent by weight and the glass-graphite content is between 55 and 80 percent by weight.

4. A method of forming a composite sheet of resin-glass strand and carbon strand comprising introducing glass strand into a body of curable resin, passing the glass strand through the body of curable resin to coat the glass strand with resin, passing the strand after coating through a die to remove excess resin and regulate the resin content of the glass, introducing carbon strands directly into the die to minimize fiberizing of said carbon strand and physically combining it with the glass strand in the die while applying to the carbon strand resin contained on the die, passing the consolidated glass-carbon strand emerging from the die through a guide, and winding the consolidated strand on a rotating surface by reciprocating consolidated strand across the surface in a horizontal plane until the surface is covered to a desired depth with a sheet of resin-glass strand and carbon strand and removing the sheet from said surface in an uncured state.

5. The method of claim 4 wherein the resin content of the carbon and glass strands is controlled to between 45 and 20 percent by weight.

* * * * *